US012304042B2

(12) United States Patent
Wu

(10) Patent No.: US 12,304,042 B2
(45) Date of Patent: May 20, 2025

(54) LOCKING PLIERS

(71) Applicant: Ming-Chieh Wu, Taichung (TW)

(72) Inventor: Ming-Chieh Wu, Taichung (TW)

( * ) Notice: Subject to any disclaimer, the term of this patent is extended or adjusted under 35 U.S.C. 154(b) by 362 days.

(21) Appl. No.: 18/154,839

(22) Filed: Jan. 15, 2023

(65) Prior Publication Data

US 2023/0249320 A1 Aug. 10, 2023

(30) Foreign Application Priority Data

Feb. 9, 2022 (TW) ................................ 111104756

(51) Int. Cl.
*B25B 7/04* (2006.01)
*B25B 7/14* (2006.01)

(52) U.S. Cl.
CPC . *B25B 7/04* (2013.01); *B25B 7/14* (2013.01)

(58) Field of Classification Search
CPC .. B25B 5/00; B25B 5/003; B25B 5/02; B25B 5/04; B25B 5/062; B25B 5/064; B25B 5/067; B25B 5/068; B25B 5/082; B25B 5/101; B25B 5/103; B25B 5/104; B25B 5/12; B25B 5/125; B25B 5/127; B25B 5/14; B25B 5/16; B25B 5/163; B25B 7/02; B25B 7/04; B25B 7/06; B25B 7/10; B25B 7/123; B25B 7/14; B25B 7/18
See application file for complete search history.

(56) References Cited

U.S. PATENT DOCUMENTS 5,050,466 A * 9/1991 Cameron ................ B25B 5/163 81/421
7,104,166 B1 * 9/2006 Wong ...................... B25B 7/123 81/180.1

* cited by examiner

*Primary Examiner* — Robert J Scruggs

(57) ABSTRACT

A locking pliers includes a pliers-body, a rotating shaft and an operating and pivoting unit. The pliers-body includes a fixed jaw, a movable jaw and a jaw end member disposed on the movable jaw. The rotating shaft is rotatably connected with the fixed jaw about a pivot axis and is movable along the pivot axis, and has clamp and insert ends. A clamp member is disposed on the clamp end. A pivot member extends through the fixed jaw and connected with the rotating shaft and is operable to move the rotating shaft close to or away from the fixed jaw. A retaining member extends through the fixed jaw and the rotating shaft to retain the rotating shaft to a first or second position. With the rotating shaft rotated between first and second positions, the locking pliers can be shifted to two types of use.

8 Claims, 22 Drawing Sheets

LOCKING PLIERS

CROSS-REFERENCE TO RELATED APPLICATION

This application claims priority of Taiwanese Patent Application No. 111104756, filed on Feb. 9, 2022, the disclosure of which is herein incorporated by reference.

FIELD

This disclosure relates to a pair of locking pliers, more particularly to a locking pliers that is shiftable to two types of use.

BACKGROUND

Referring to FIG. 1A, a conventional pair of C-clamp locking pliers (1*a*) includes two grip pads 11 for clamping down and on a plate-like workpiece (not shown).

Referring to FIG. 1B, another pair of conventional C-clamp locking pliers (1*b*) includes an insert rod 12 for inserting into an inclined hole (not shown) of an upright wall of a workpiece (not shown), and a grip pad 13 which cooperates with the insert rod 12 to clamp a base wall of the workpiece.

For meeting different requirements of usage, both the conventional locking pliers (1*a* and 1*b*) will need advanced preparation before use, which results in inefficiency and inconvenience during usage.

SUMMARY

Therefore, an object of the disclosure is to provide a XXXX that can alleviate at least one of the drawbacks of the prior art. Therefore, an object of the disclosure is to provide a pair of locking pliers that can alleviate at least one of the drawbacks of the prior art.

According to this disclosure, the locking pliers includes a pliers-body, a rotating shaft and an operating and pivoting unit. The pliers-body includes a fixed jaw, a movable jaw which is pivotable disposed relative to the fixed jaw, and a jaw end member which is disposed on a tip end of the movable jaw. The rotating shaft is movably connected with the fixed jaw, and includes a shaft body and a clamp member. The shaft body is rotatably connected with the fixed jaw about a pivot axis and is movable relative to the fixed jaw along the pivot axis. The shaft body has a clamp end and an insert end opposite to each other. The clamp member is disposed on the clamp end. The rotating shaft is operable to rotate relative to the fixed jaw between a first position, where the clamp member is disposed proximate to the jaw end member, and a second position, where the insert end is disposed proximate to the jaw end member. The operating and pivoting unit includes a pivot member and at least one retaining member. The pivot member extends along the pivot axis and through the fixed jaw and is connected with the rotating shaft. The pivot member is operable to move along the pivot axis to bring the rotating shaft into movement close to or away from the fixed jaw. The retaining member extends through the fixed jaw and the rotating shaft along a retaining axis that is parallel to and offset from the pivot axis so as to retain the rotating shaft to a selected one of the first and second positions. The pivot member is operably moved to bring the rotating shaft into movement away from the fixed jaw and to release the retention of the rotating shaft by the retaining member so as to permit rotation of the rotating shaft about the pivot axis.

With the rotating shaft operable to rotate relative to the pliers-body between the first and second positions, the locking pliers can be shifted to two types of use for improved versatility, and hence cost savings may be obtained.

BRIEF DESCRIPTION OF THE DRAWINGS

Other features and advantages of the disclosure will become apparent in the following detailed description of the embodiment with reference to the accompanying drawings. It is noted that various features may not be drawn to scale.

DETAILED DESCRIPTION

Figure 1A:
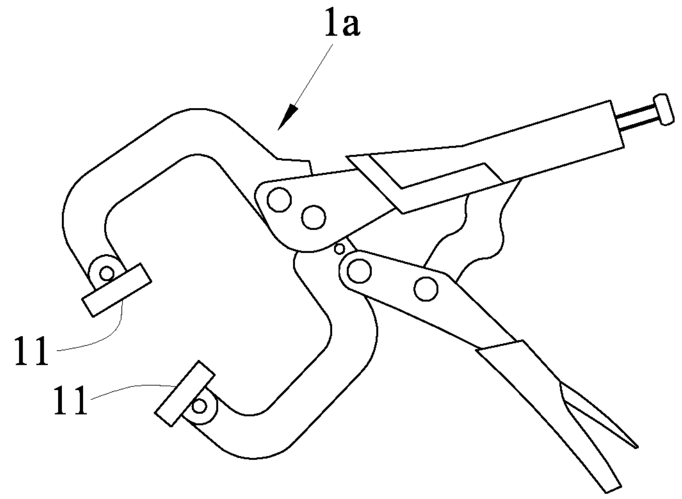
FIG.1A PRIOR ART
FIGS. 1A and 1B are schematic side views of conventional C-clamp locking pliers.
Figure 1B:
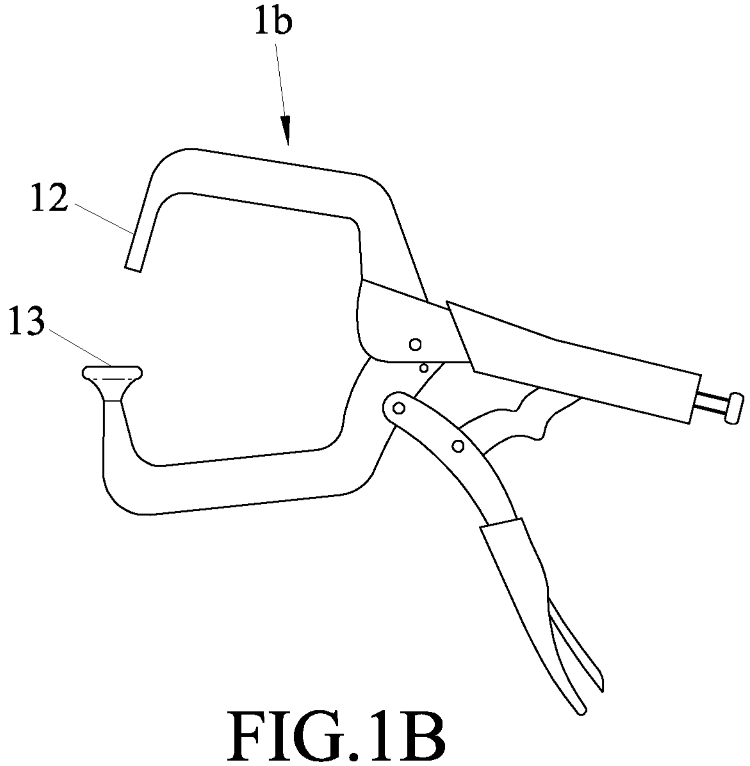
FIG.1B PRIOR ART

Before the disclosure is described in greater detail, it should be noted that where considered appropriate, reference numerals or terminal portions of reference numerals have been repeated among the figures to indicate corresponding or analogous elements, which may optionally have similar characteristics. In the following description, directions, such as "front-rear direction (X)", "left-right direction (Y)" and "up-down direction (Z)", indicate the orientations of the embodiments in the figures.

Figure 2:
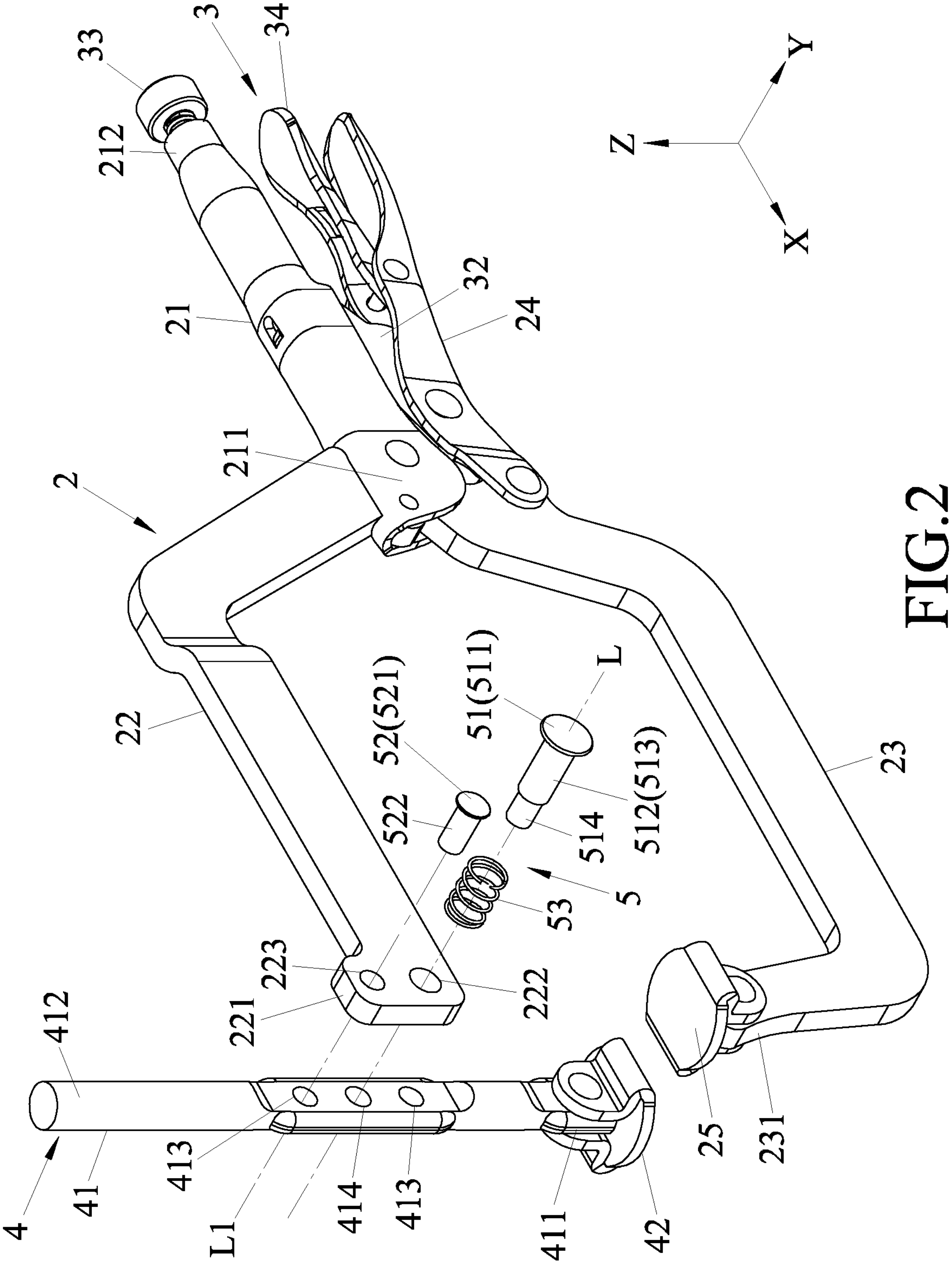
FIG. 2 is an exploded perspective view of a first embodiment of a pair of locking pliers according to this disclosure.
Figure 3:
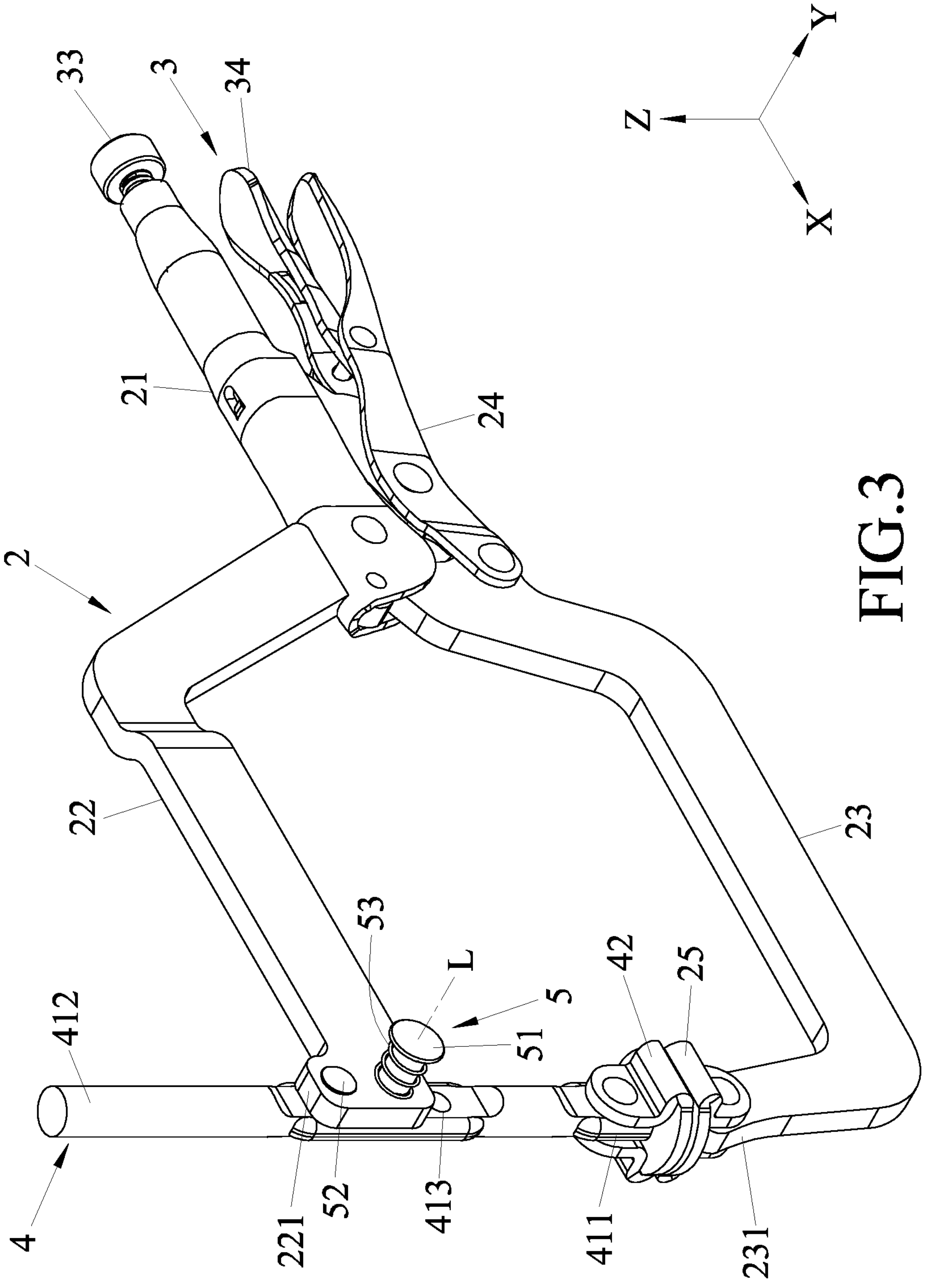
FIG. 3 is a perspective view of the first embodiment.
Figure 4:
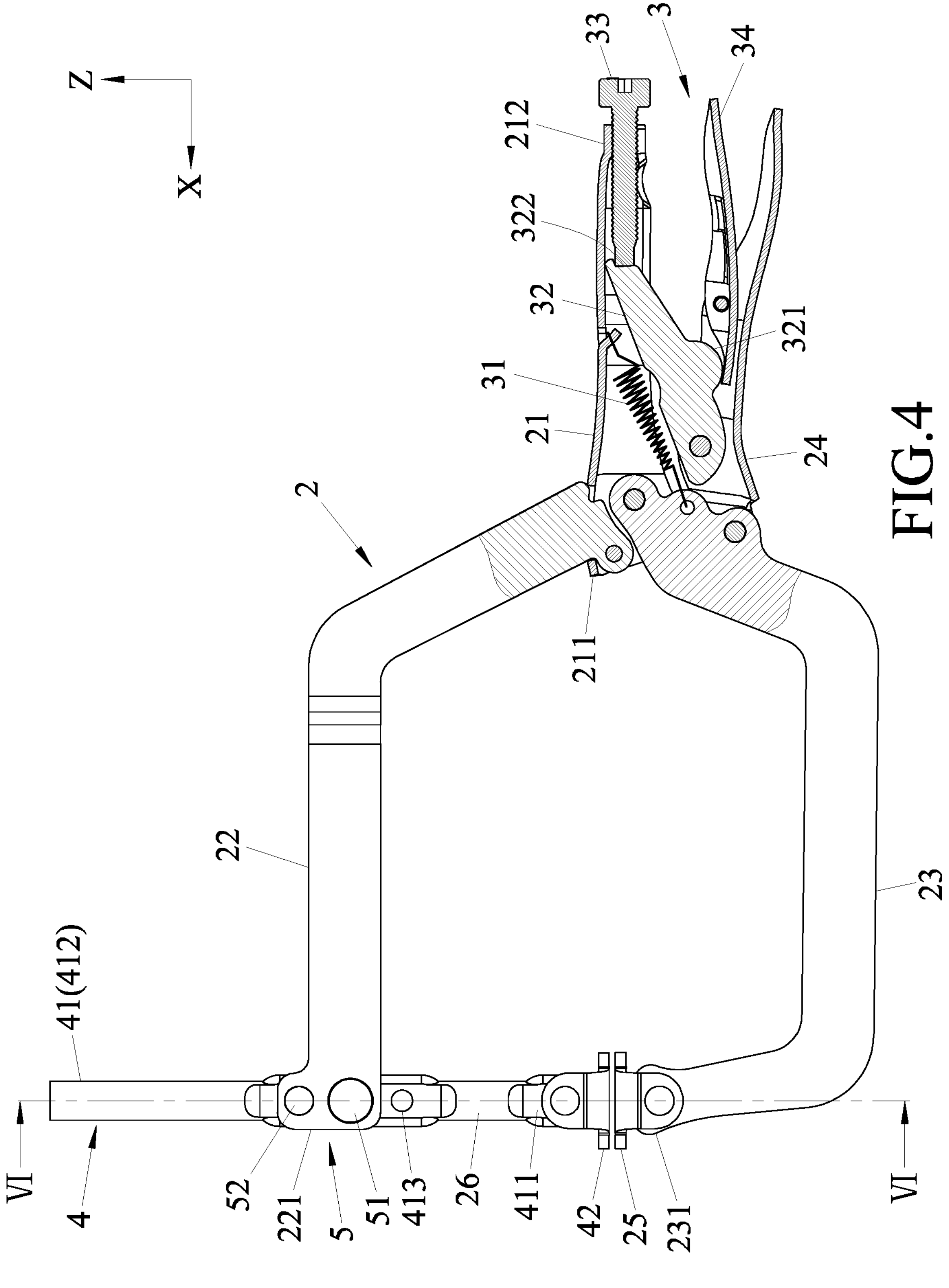
FIG. 4 is a partially sectioned side view of the embodiment in a state when a rotating shaft is in a first position.

Referring to FIGS. 2, 3 and 4, a first embodiment of a pair of locking pliers according to the disclosure includes a pliers-body 2, an adjusting unit 3, a rotating shaft 4 and an operating and pivoting unit 5.

The pliers-body 2 includes a fixed handle 21 which extends in a front-rear direction (X) to have front and rear ends 211, 212, a fixed jaw 22 which is connected with the front end 211 of the fixed handle 21 and which extends upwardly and forwardly, a movable jaw 23 which is pivotably disposed on the front end 211 of the fixed handle 21 relative to the fixed jaw 22 and which extends downwardly and forwardly to be in a C-shaped contour, a movable handle 24 which is pivotably connected with the movable jaw 23 and which extends rearwardly, and a jaw end member 25 which is pivotably disposed on a tip end 231 of the movable jaw 23. The fixed jaw 22 has a mounting end 221 which is distal from the front end 211 of the fixed handle 21 in the front-rear direction (X), a pivot hole 222 which extends through the mounting end 221 and along a pivot axis (L) in a left-right direction (Y), and a retaining hole 223 which extends through the mounting end 221 and along a retaining axis (L1) that is parallel to and offset from the pivot axis (L) and which is spaced apart from the pivot hole 222 in an up-down direction (Z). In this embodiment, the retaining hole 223 is formed above the pivot hole 222. Alternatively, the retaining hole 223 may be formed below the pivot hole 222. The mounting end 221 is spaced apart from the tip end 231 by a clearance 26.

The adjusting unit 3 is disposed to adjust the clearance 26 of the pliers-body 2. The adjusting unit 3 includes a biasing spring 31, a linkage 32, an adjustment screw 33 and an unlocking lever 34. In this embodiment, the biasing spring 31 is a tension spring connected between the fixed handle 21 and the movable jaw 23 to bias the tip end 231 of the movable jaw 23 away from the mounting end 221 of the fixed jaw 22. The linkage 32 is pivotably connected with the movable handle 24 and extends rearwardly toward the fixed handle 21. The linkage 32 has a protrusion 321 projecting downwardly, and a rear abutted end 322. The adjustment screw 33 is threadedly engaged with the rear end 212 of the fixed handle 21 to press the rear abutted end 322 of the linkage 32. The unlocking lever 34 is pivotably connected with the movable handle 24 and has one end pressed by the protrusion 321 to permit the other end to be pivotable relative to the movable handle 24.

Figure 5:
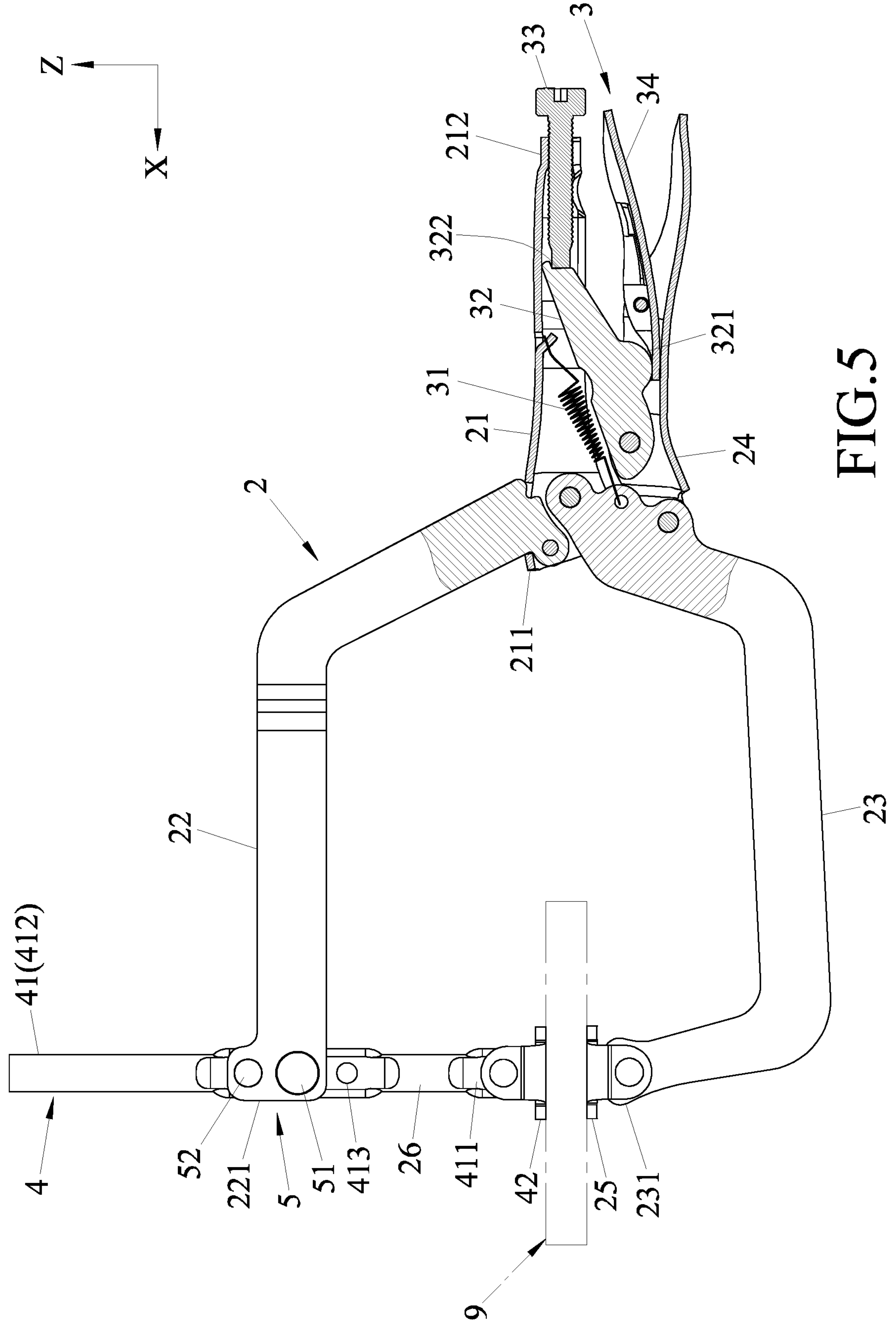
FIG. 5 is a partially sectioned side view of the embodiment in a state when the rotating shaft is in the first position and a plate-like workpiece is clamped.

With reference to FIGS. 4 and 5, the clearance 26 of the pliers-body 2 can be adjusted by screwing the adjustment screw 33. As shown in FIG. 4, when the adjustment screw 33 is screwed forward to press and move the rear abutted end 322 forward, the tip end 231 of the movable jaw 23 is turned toward the mounting end 221 of the fixed jaw 22 so as to decrease the clearance 26 and the biasing spring 31 is tensed. As shown in FIG. 5, when the adjustment screw 33 is screwed rearward to pull the tip end 231 of the movable jaw 23 away from the mounting end 221 of the fixed jaw 22, the rear abutted end 322 is moved rearward to abut against and to be positioned by the adjustment screw 33, and the clearance 26 is enlarged. In addition, by turning of the unlocking lever 34, the linkage 32 is pressed by the unlocking lever 34 to be unlocked from the adjustment screw 33.

Figure 6:
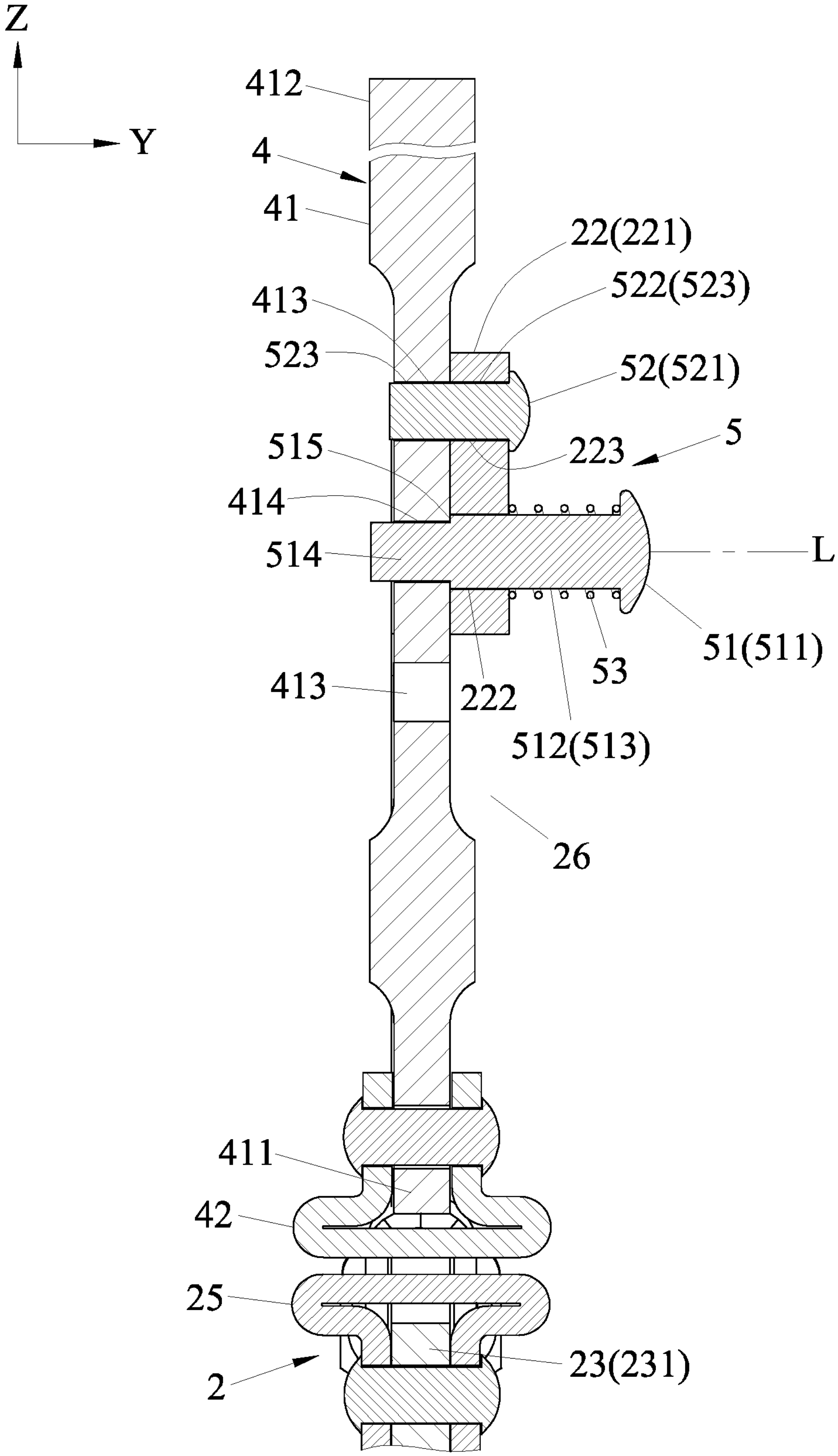
FIG. 6 is a sectional view taken along line VI-VI of FIG. 4.

With reference to FIGS. 2, 4 and 6, the rotating shaft 4 is movably connected with the fixed jaw 22, and includes a shaft body 41 and a clamp member 42. The shaft body 41 is rotatably connected with the fixed jaw 22 about the pivot axis (L) and is movable relative to the fixed jaw 22 along the pivot axis (L). Specifically, the shaft body 41 has a clamp end 411 and an insert end 412 opposite to each other. The clamp member 42 is pivotably disposed on the clamp end 411. The shaft body 41 has two retained holes 413 which are spaced apart from each other and which extend in the direction of the pivot axis (L) (i.e., in the left-right direction (Y)) to be aligned with the retaining hole 223, and a connecting hole 414 which extends therethrough and which is aligned with the pivot hole 222 along the pivot axis (L). The retained holes 413 are located respectively proximate to the insert end 412 and the clamp end 411. The connecting hole 414 has an inner diameter smaller than that of the pivot hole 222 of the fixed jaw 22.

In this embodiment, each of the jaw end member 25 of the pliers-body 2 and the clamp member 42 of the rotating shaft 4 is in the form of a flat pad.

The operating and pivoting unit 5 includes a pivot member 51, a retaining member 52 and a biasing member 53.

The pivot member 51 extends along the pivot axis (L) and through the pivot hole 222 of the fixed jaw 22 and the connecting hole 414 of the rotating shaft 4 and is operable to move along the pivot axis (L) so as to bring the rotating shaft 4 into movement close to or away from the fixed jaw 22. Specifically, the pivot member 51 has an enlarged head portion 511 and a shank portion 512 which extends from the head portion 511 along the pivot axis (L). The head portion 511 is disposed to be spaced apart from the rotating shaft 4 in the direction of the pivot axis (L) by the fixed jaw 22. The shank portion 512 extends through the fixed jaw 22 and the rotating shaft 4. The shank portion 512 has a pivot axle section 513 which extends through the pivot hole 222 of the fixed jaw 22, a connecting section 514 which extends from the pivot axle section 513 and into the connecting hole 414 of the rotating shaft 4 and which has an outer diameter smaller than that of the pivot axle section 513, and a shoulder 515 which is interposed between the pivot axle section 513 and the connecting section 514 and which abuts against the rotating shaft 4.

In this embodiment, the connecting hole 414 is in the form of a circular hole. The connecting section 514 has a circular cross-section and is rotatably engaged in the connecting hole 414 to permit rotation of the rotating shaft 4 relative to the pivot member 51 about the pivot axis (L).

In this embodiment, the retaining member 52 is in the form of a rivet which extends through the fixed jaw 22 and the rotating shaft 4 along the retaining axis (L1) so as to restrict rotation of the rotating shaft 4 relative to the fixed jaw 22. The retaining member 52 has a rivet head 521 and a rivet shank 522 extending from the rivet head 521 along the retaining axis (L1). The rivet shank 522 has first and second retaining sections 523 which are connected with each other along the retaining axis (L1) and which are respectively engaged in the retaining hole 223 of the fixed jaw and either one of the retained holes 413 of the rotating shaft 4.

The biasing member 53 surrounds the pivot axle section 513 of the pivot member 51 and is disposed between the head portion 511 and the fixed jaw 22 to bias the head portion 511 away from the fixed jaw 22 so as to bring the rotating shaft 4 toward the fixed jaw 22.

Figure 9:
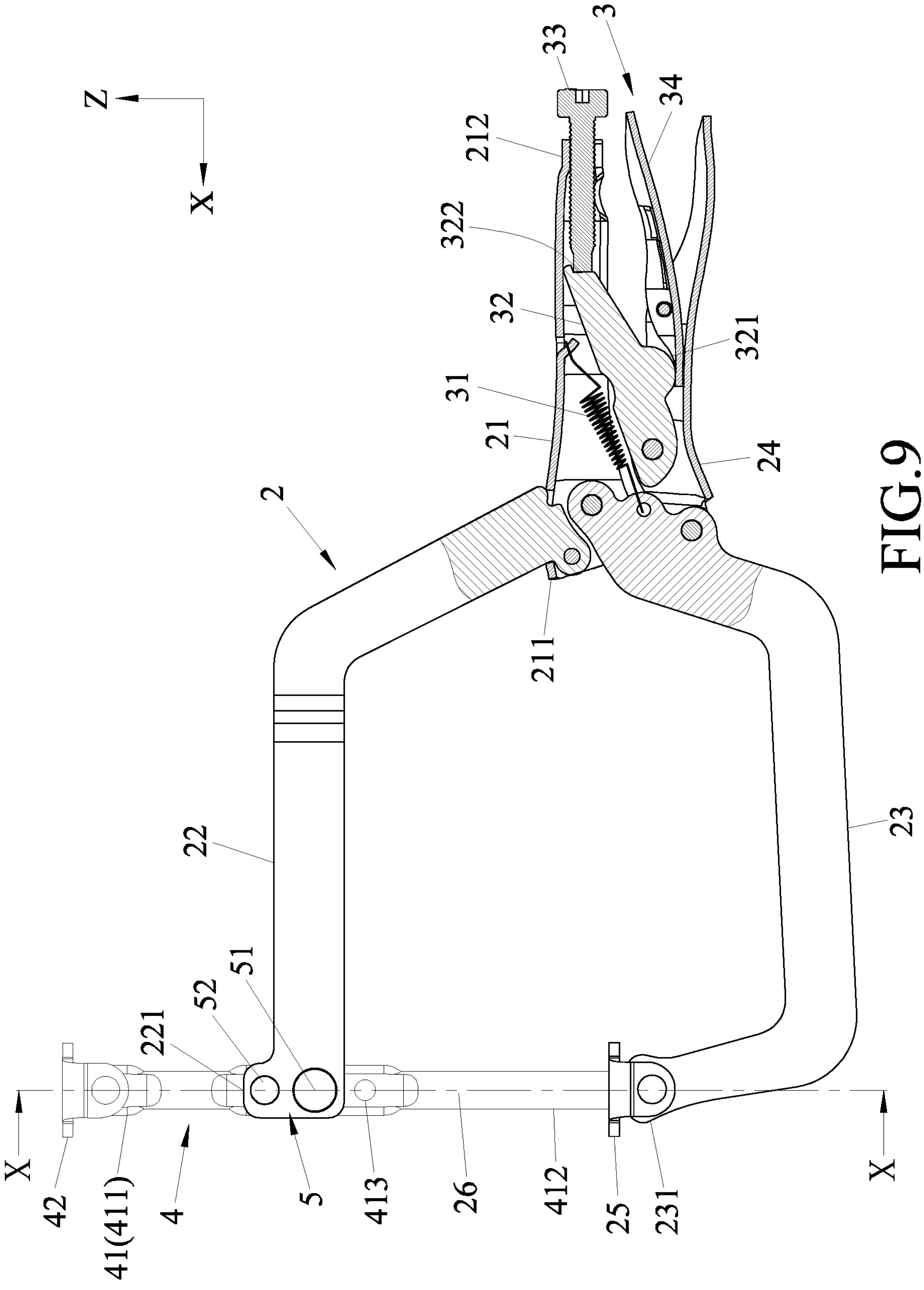
FIG. 9 is a partially sectioned side view of the embodiment in a state when a rotating shaft is in the second position.
Figure 10:
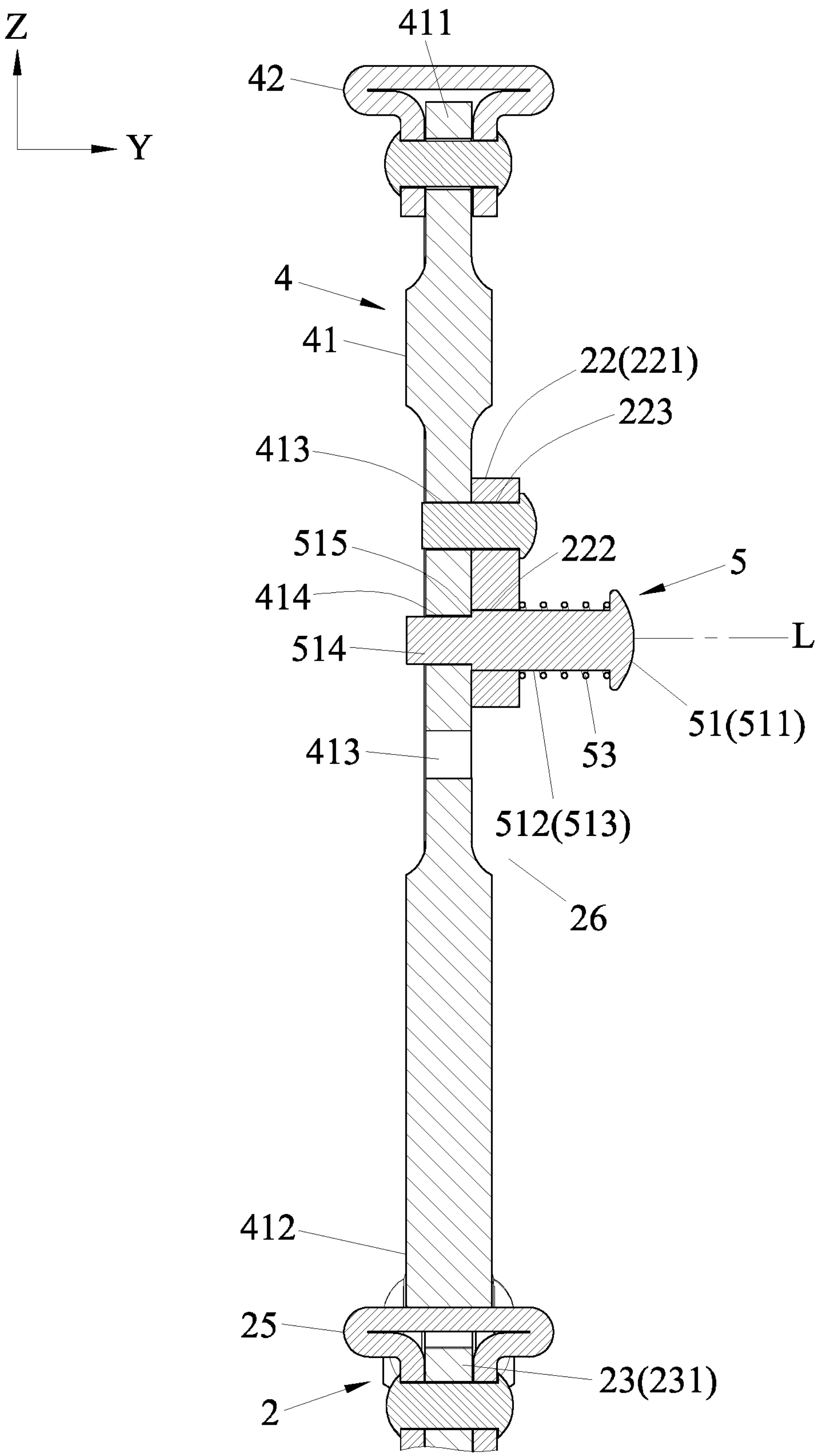
FIG. 10 is a sectional view taken along line X-X of FIG. 9.

With reference to FIG. 4 and FIGS. 6 to 10, the rotating shaft 4 is operable to rotate relative to the fixed jaw 22 between a first position (as shown in FIG. 4), where the clamp member 42 is disposed proximate to the jaw end member 25, and a second position (as shown in FIG. 9), where the insert end 412 is disposed proximate to the jaw end member 25. In the first position, as shown in FIG. 6, the first and second retaining sections 523 of the retaining member 52 are respectively engaged in the retaining hole 223 and one retained hole 413 so as to retain the rotating shaft 4 to the first position. In the second position, as shown in FIG. 10, the first and second retaining sections 523 of the retaining member 52 are respectively engaged in the retaining hole 223 and the other retained hole 413 so as to retain the rotating shaft 4 in the second position.

Figure 7:
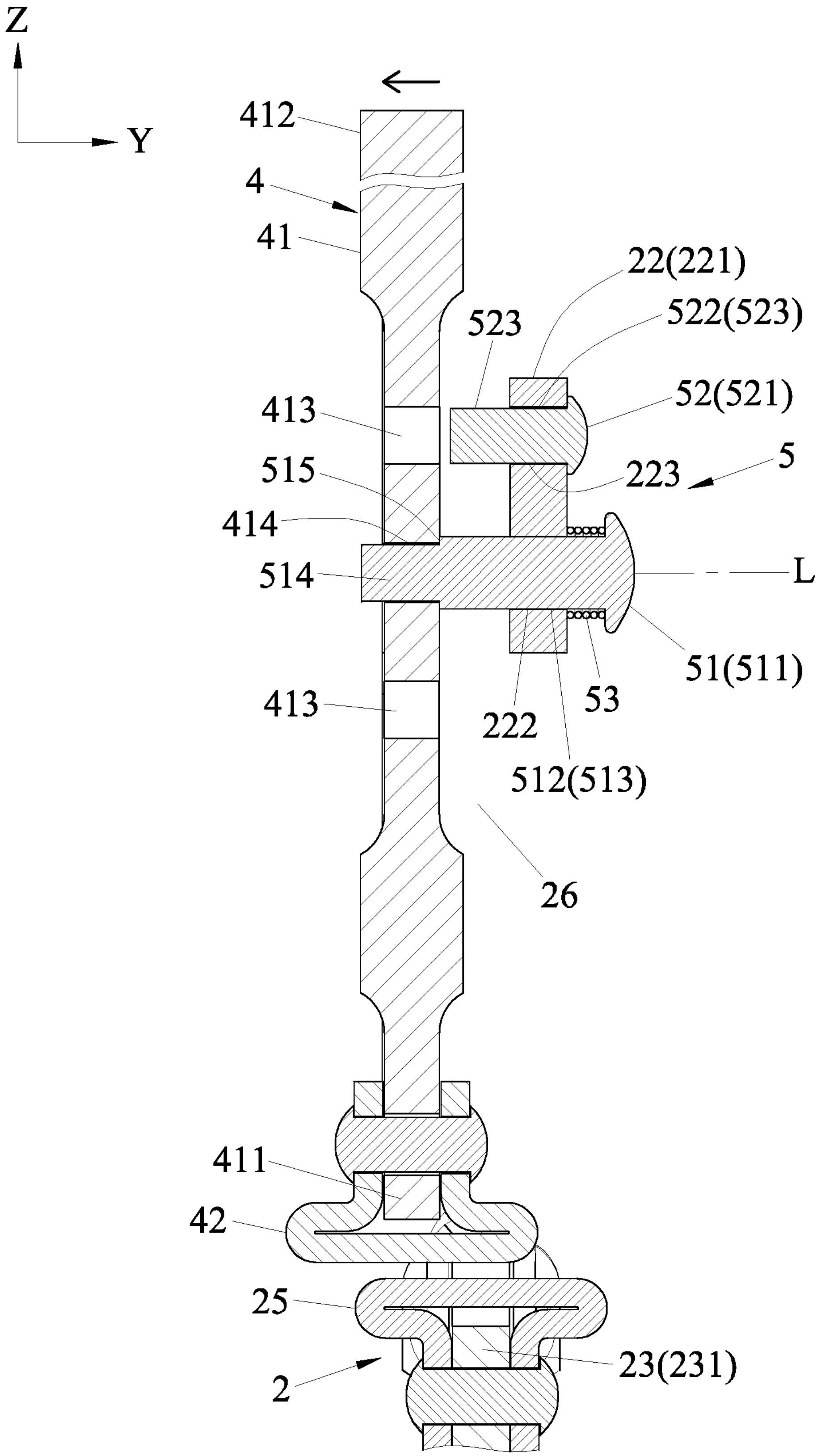
FIGS. 7 and 8 are schematic views illustrating the state when the rotating shaft is shifted from the first position to a second position.
Figure 8:
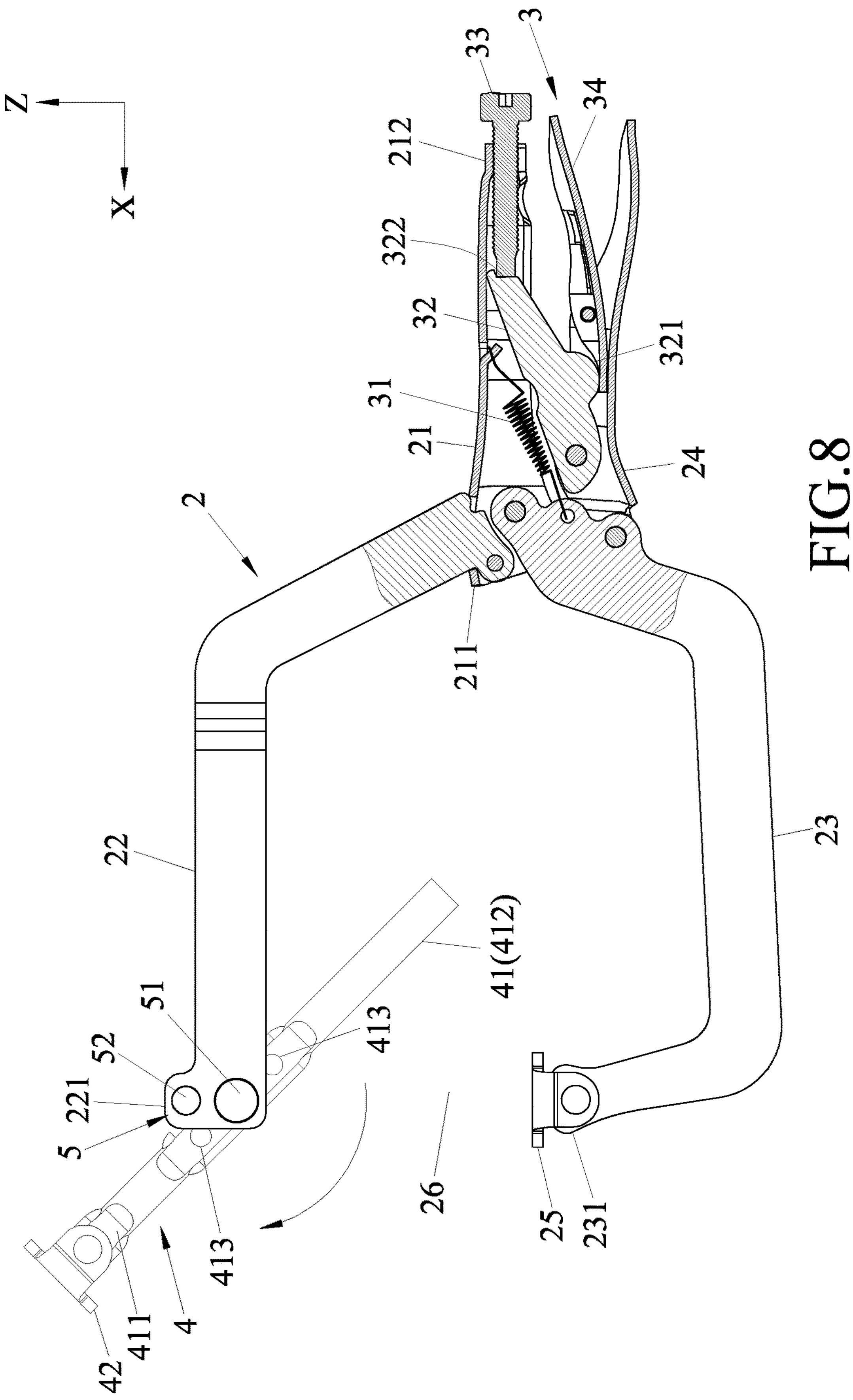

During the shifting of the rotating shaft 4 from the first position to the second position, the pivot member 51 is firstly operated to bring the rotating shaft 4 into movement along the pivot axis (L) and away from the fixed jaw 22 so as to disengage the second retaining section 523 of the retaining member 52 from the retained hole 413, as shown in FIG. 7. Subsequently, the rotating shaft 4 is operated to rotate about the pivot axis (L) relative to the pivot member 51 to bring the insert end 412 close to the jaw end member 25. The other retained hole 413 is aligned with the retaining hole 223 such that the retaining member 52 is moved by virtue of the biasing action of the biasing member 53 to extend into the aligned retained hole 413 to retain the rotating shaft 4 in the second position.

Therefore, the user presses the head portion 511 of the pivot member 51 with one hand to bring the rotating shaft 4 into movement away from the fixed jaw 22 along the pivot axis (L) so as to release the rotating shaft 4 from the fixed jaw 22, and rotates the rotating shaft 4 with the other hand to bring either the insert end 412 or the clamp member 42 close to the jaw end member 25. Then, the user releases the pressing force to permit the rotating shaft 4 to be retained in the first position or the second position.

In this embodiment, the biasing member 53 is disposed to bias the pivot member 51 away from the fixed jaw 22 so as to move the rotating shaft 4 back to abut against the fixed jaw 22 for facilitating retention by the retaining member 52. Alternatively, the rotating shaft 4 may be moved manually to be retained to the fixed jaw 22 so as to dispense the biasing member 53 therewith.

Figure 11:
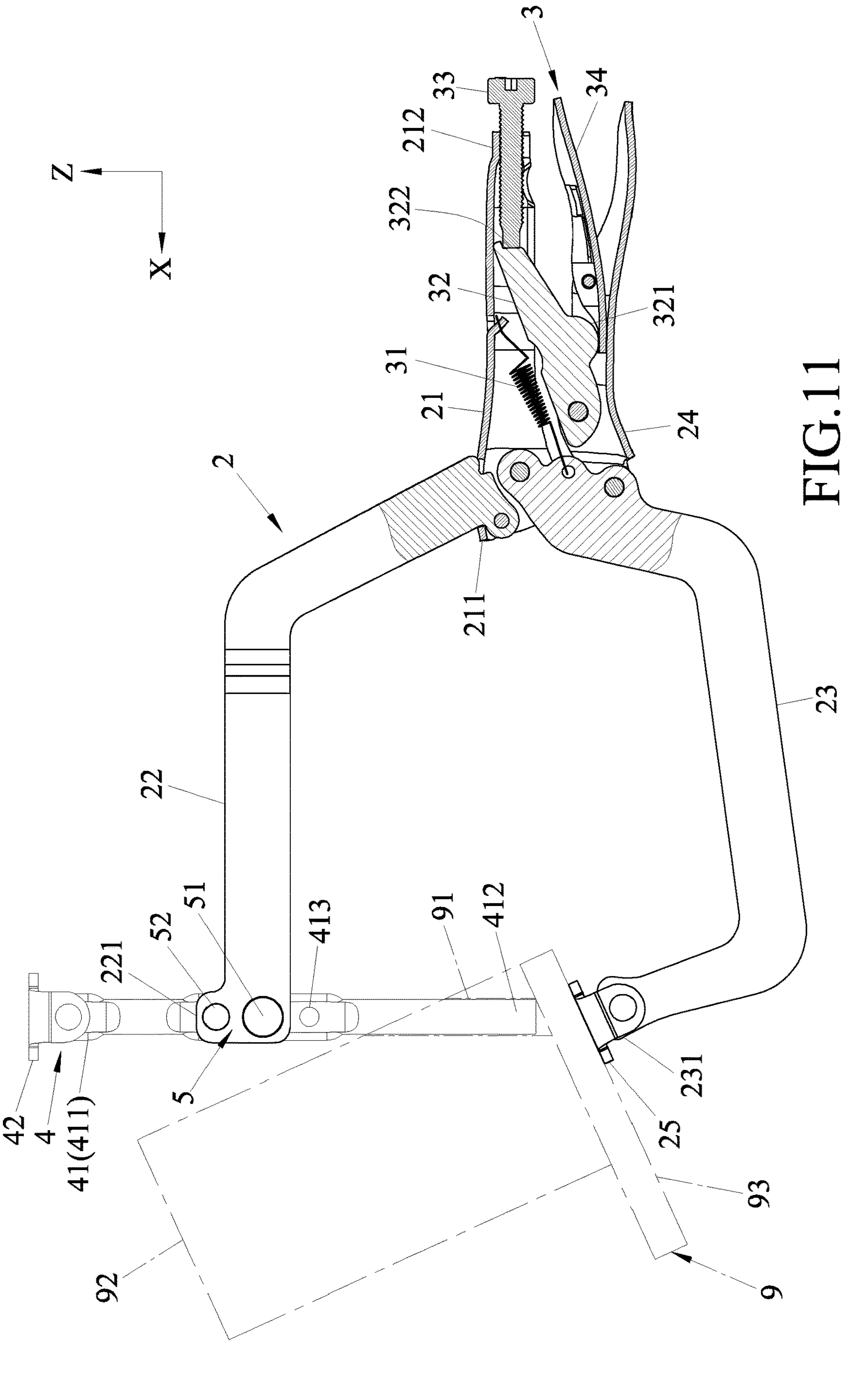
FIG. 11 is partially sectioned side view of the embodiment in a state when the rotating shaft is in the second position and a workpiece with an inclined hole is clamped.
Figure 12:
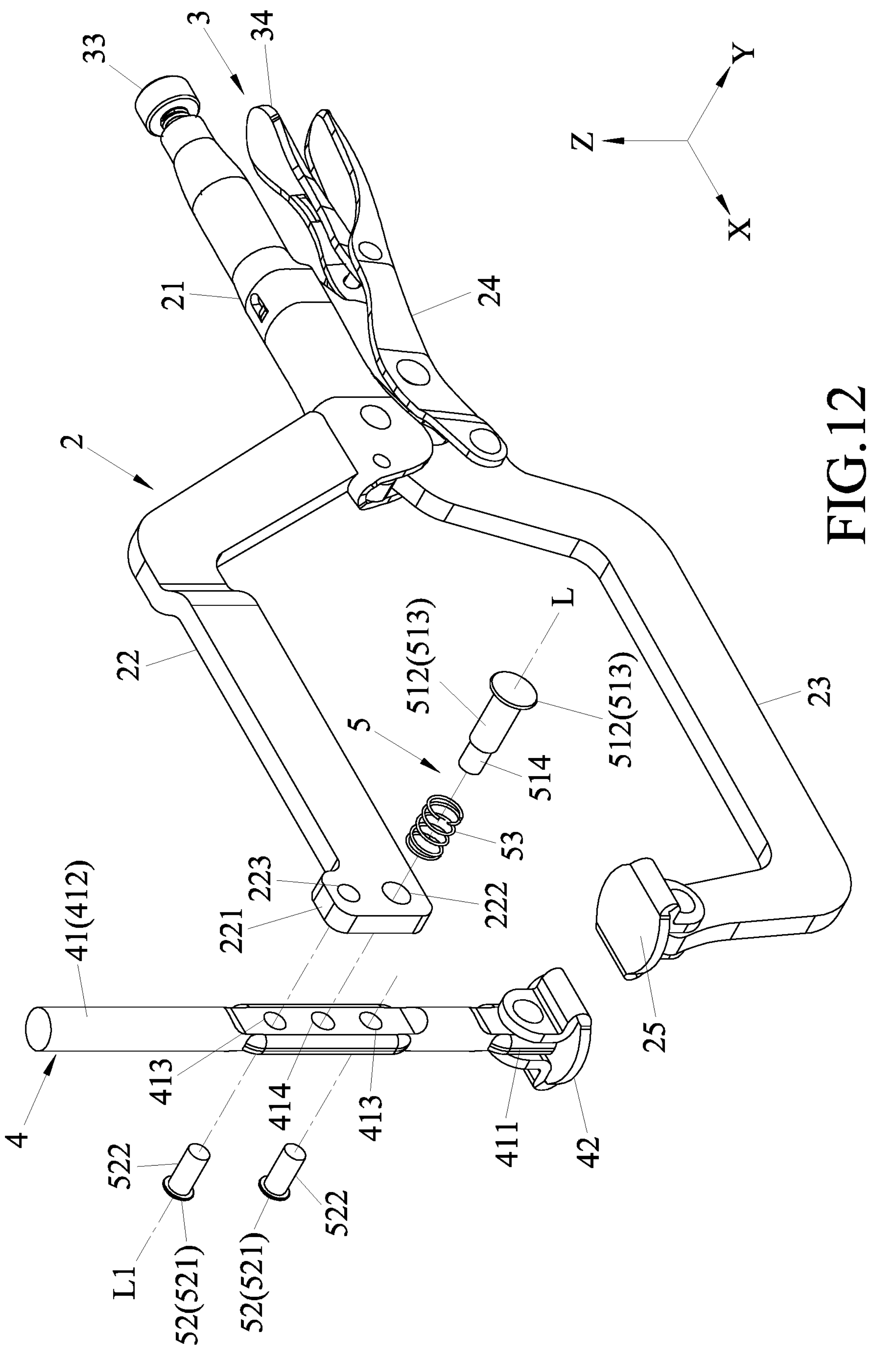
FIG. 12 is an exploded perspective view of a second embodiment of a pair of locking pliers according to this disclosure.

With reference to FIG. 5, in the first position, the clamp member 42 is close to the jaw end member 25 so as to clamp a plate-like workpiece 9. With reference to FIG. 11, in the second position, the insert end 412 is close to the jaw end member 25 such that the insert end 412 may be inserted into an inclined hole 91 of an upright wall 92 of a workpiece 9, and cooperate with the jaw end member 25 to clamp a base wall 93 of the workpiece 9. Thus, with the rotating shaft 4 being shiftable between the first and second positions, the locking pliers of the disclosure can be shifted to two types of use, and hence cost savings may be obtained.

Figure 13:
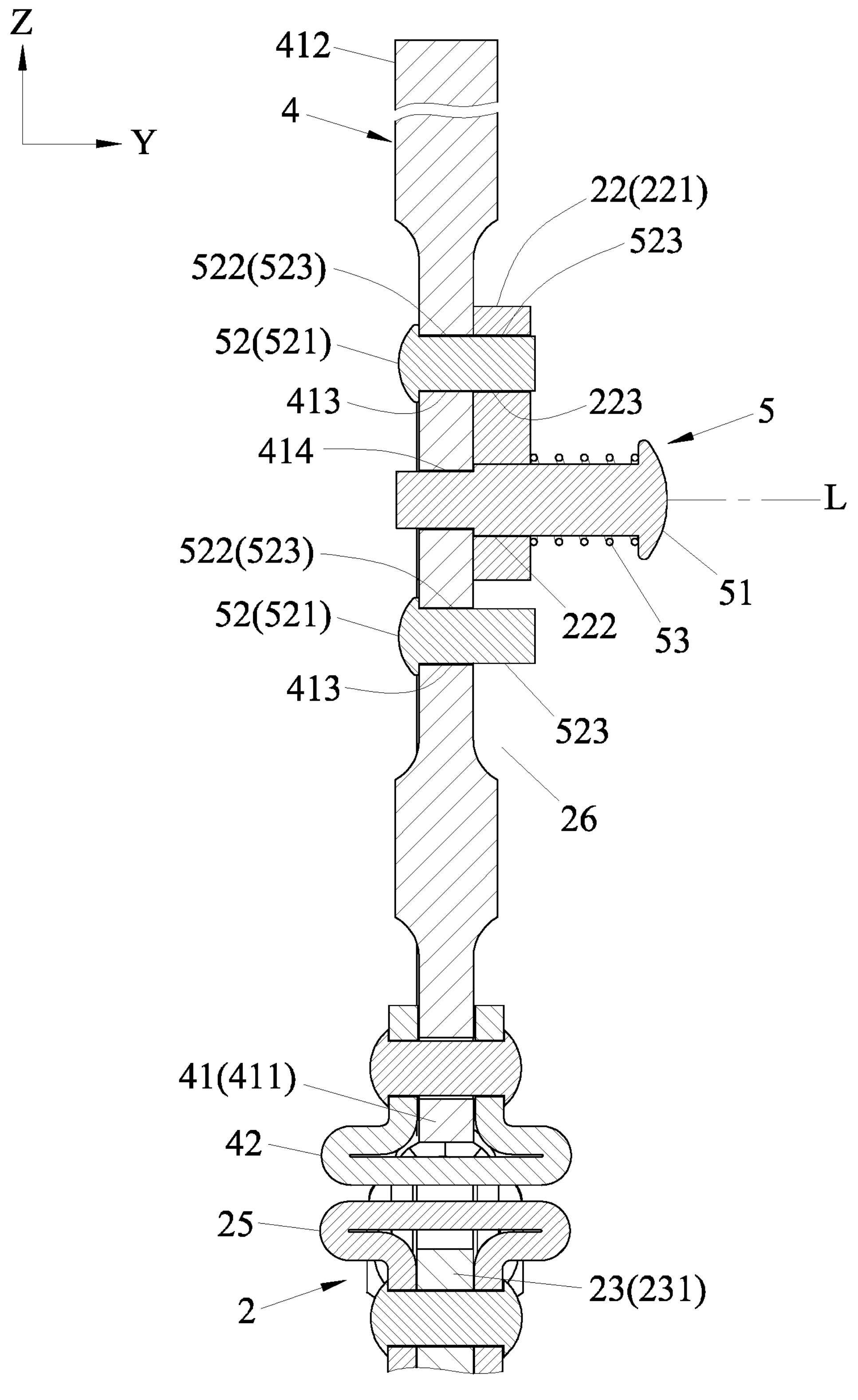
FIG. 13 is a fragmentary sectional view of the second embodiment in a state when a rotating shaft is in a first position.
Figure 14:
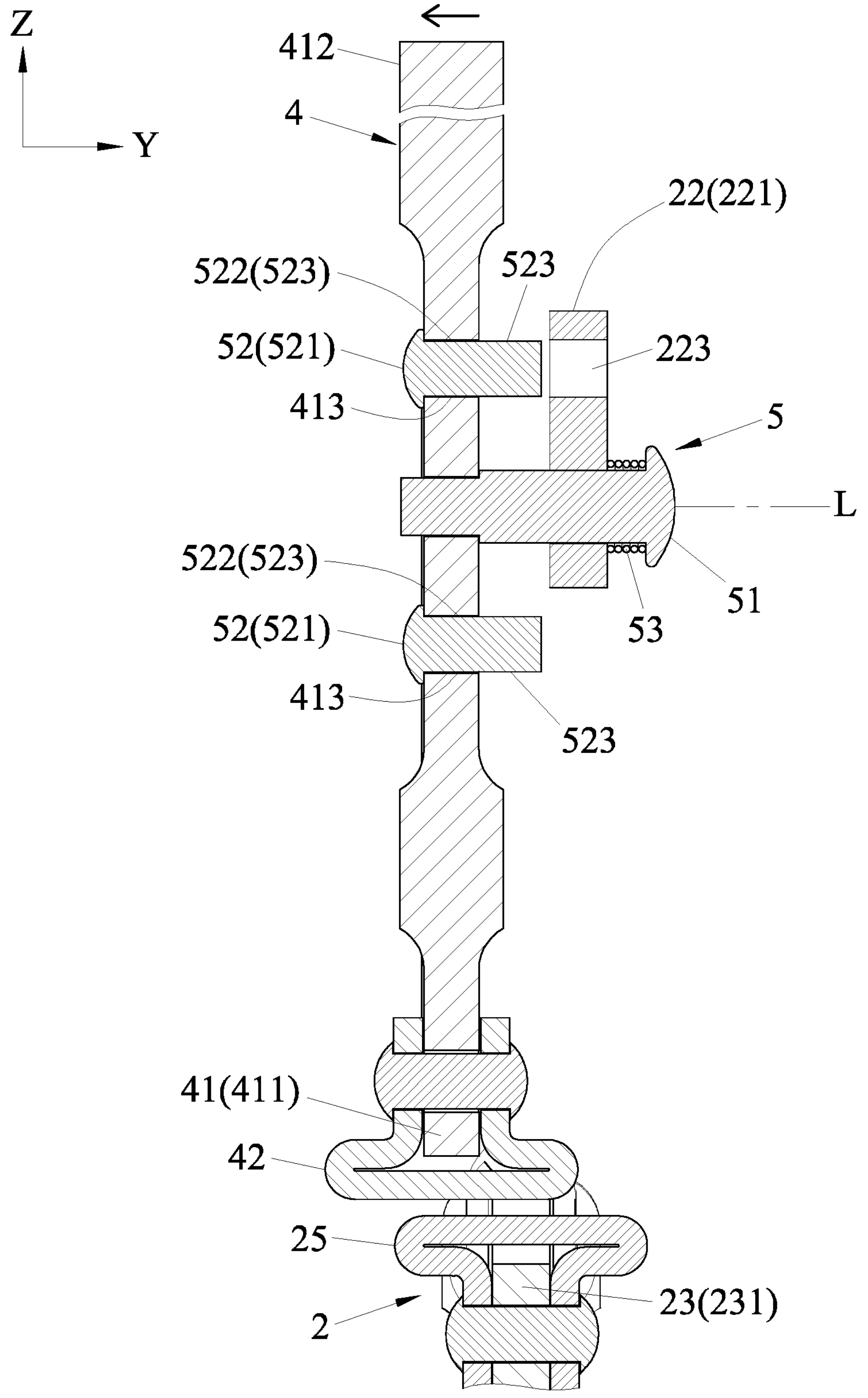
FIG. 14 is a view similar to FIG. 13, illustrating the state when the rotating shaft is shifted from the first position to a second position.
Figure 15:
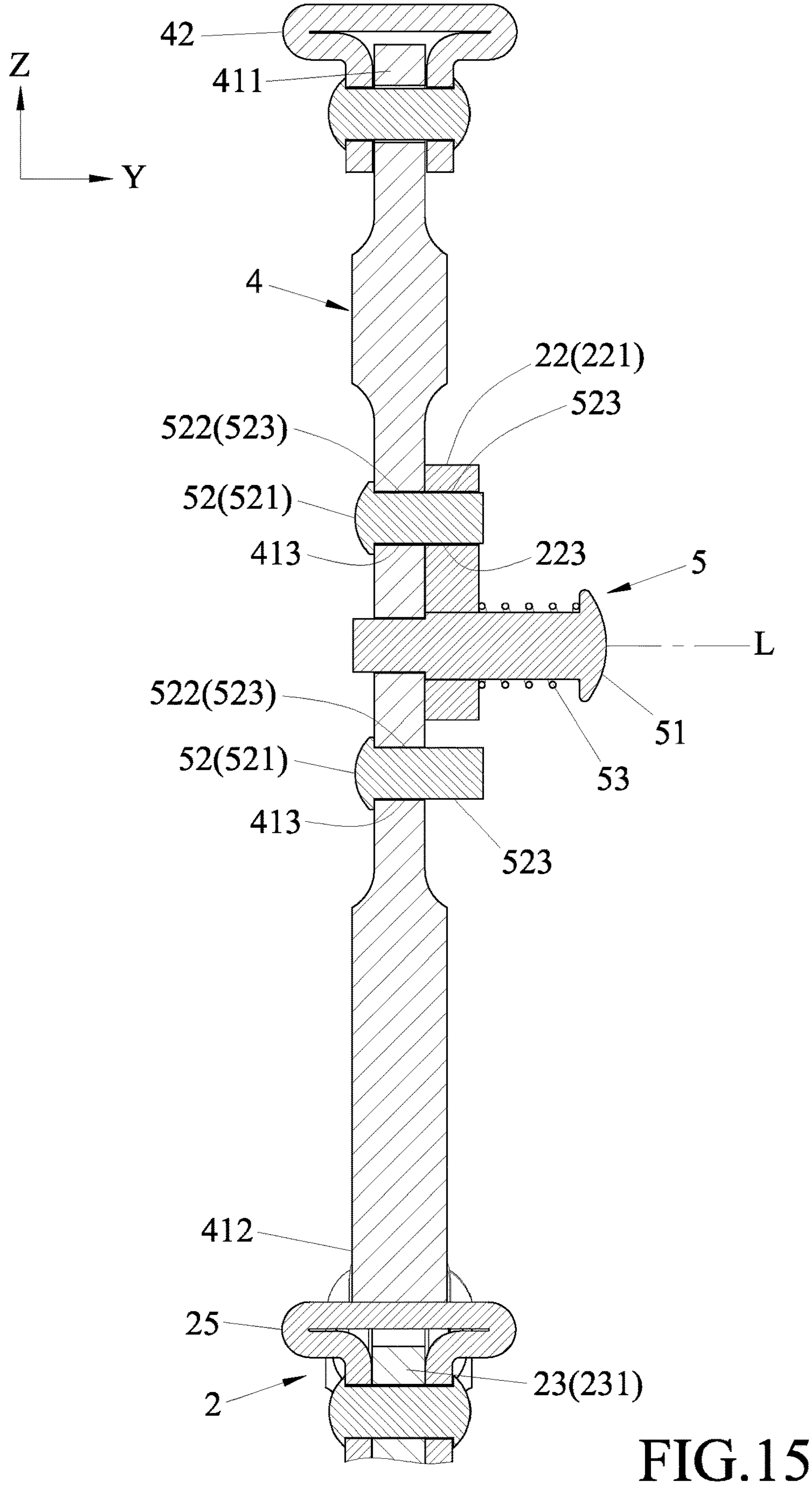
FIG. 15 is a fragmentary sectional view of the second embodiment in a state when the rotating shaft is in the second position.
Figure 16:
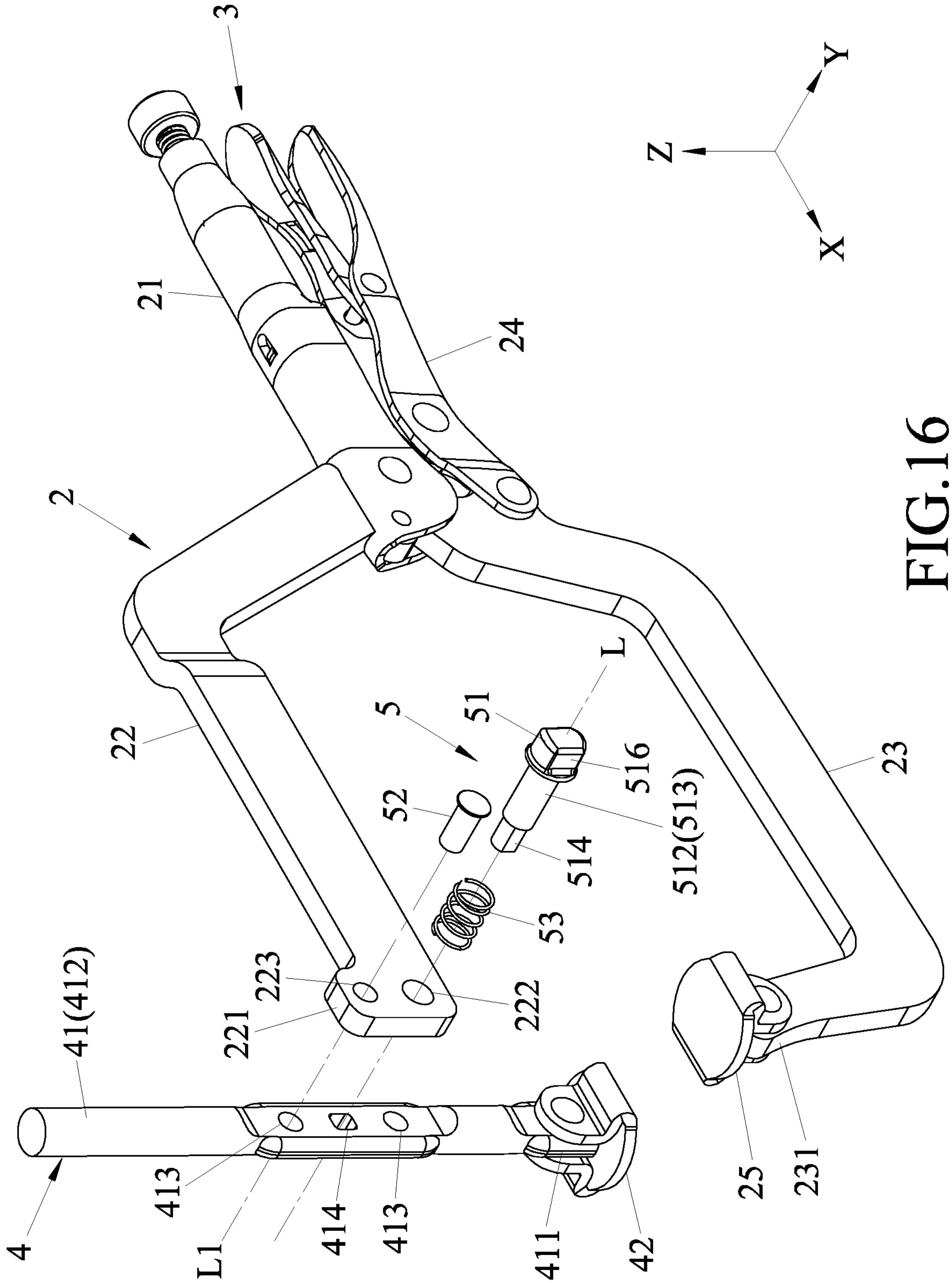
FIG. 16 is an exploded perspective view of a third embodiment of a pair of locking pliers according to this disclosure.
Figure 17:
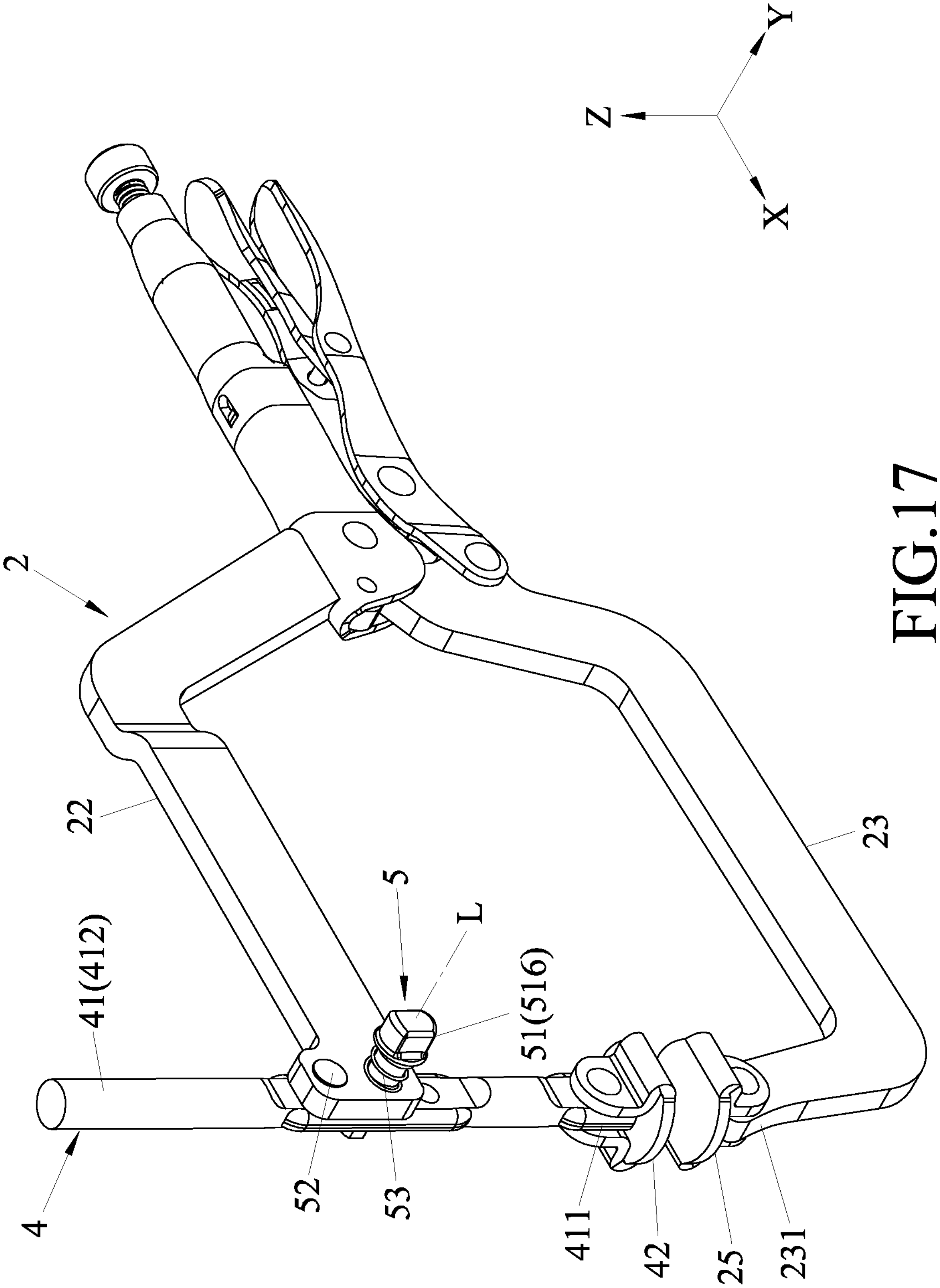
FIG. 17 is a perspective view of the third embodiment.
Figure 18:
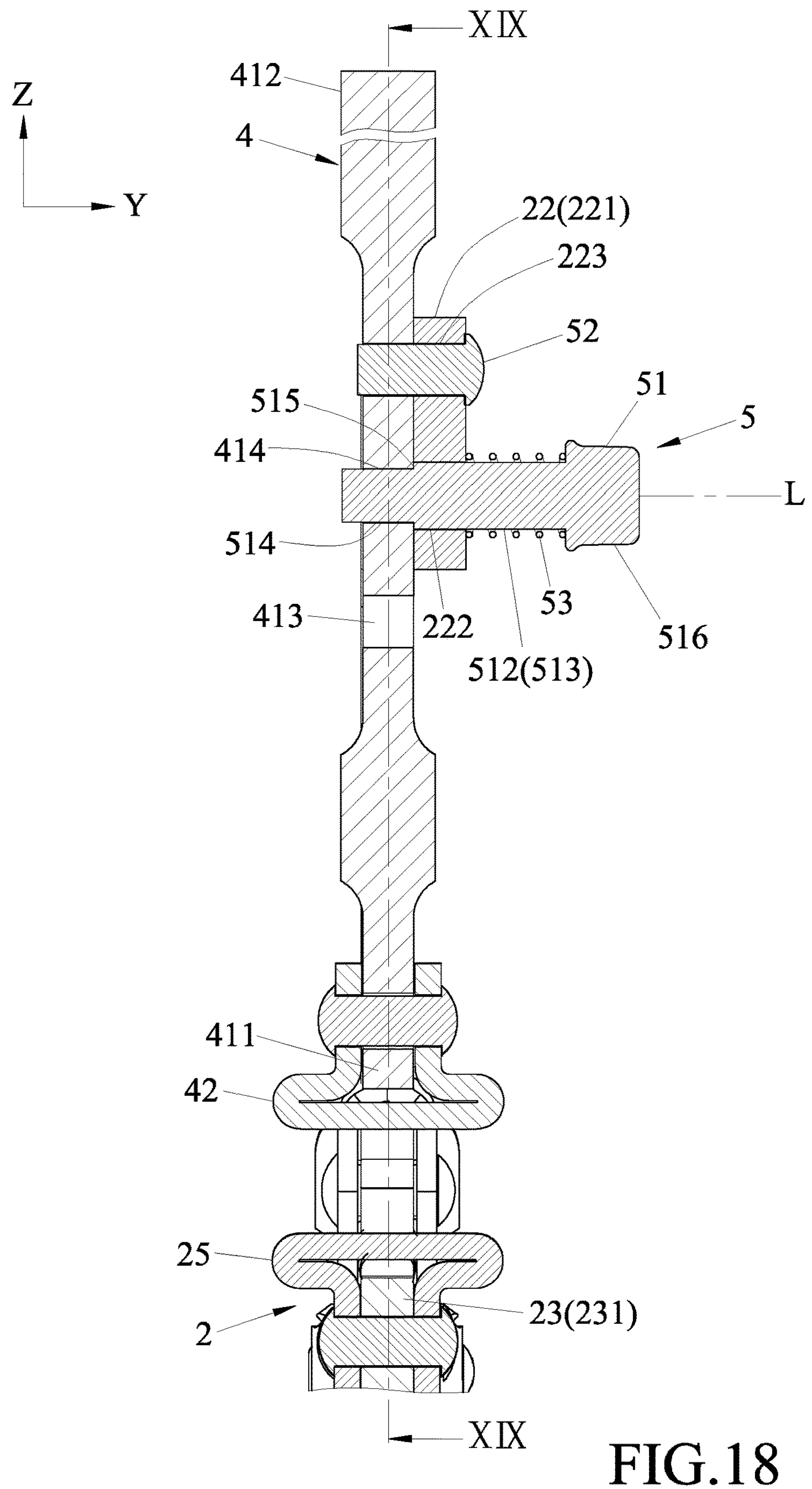
FIG. 18 is a fragmentary sectional view of the third embodiment in a state when a rotating shaft is in a first position.
Figure 19:
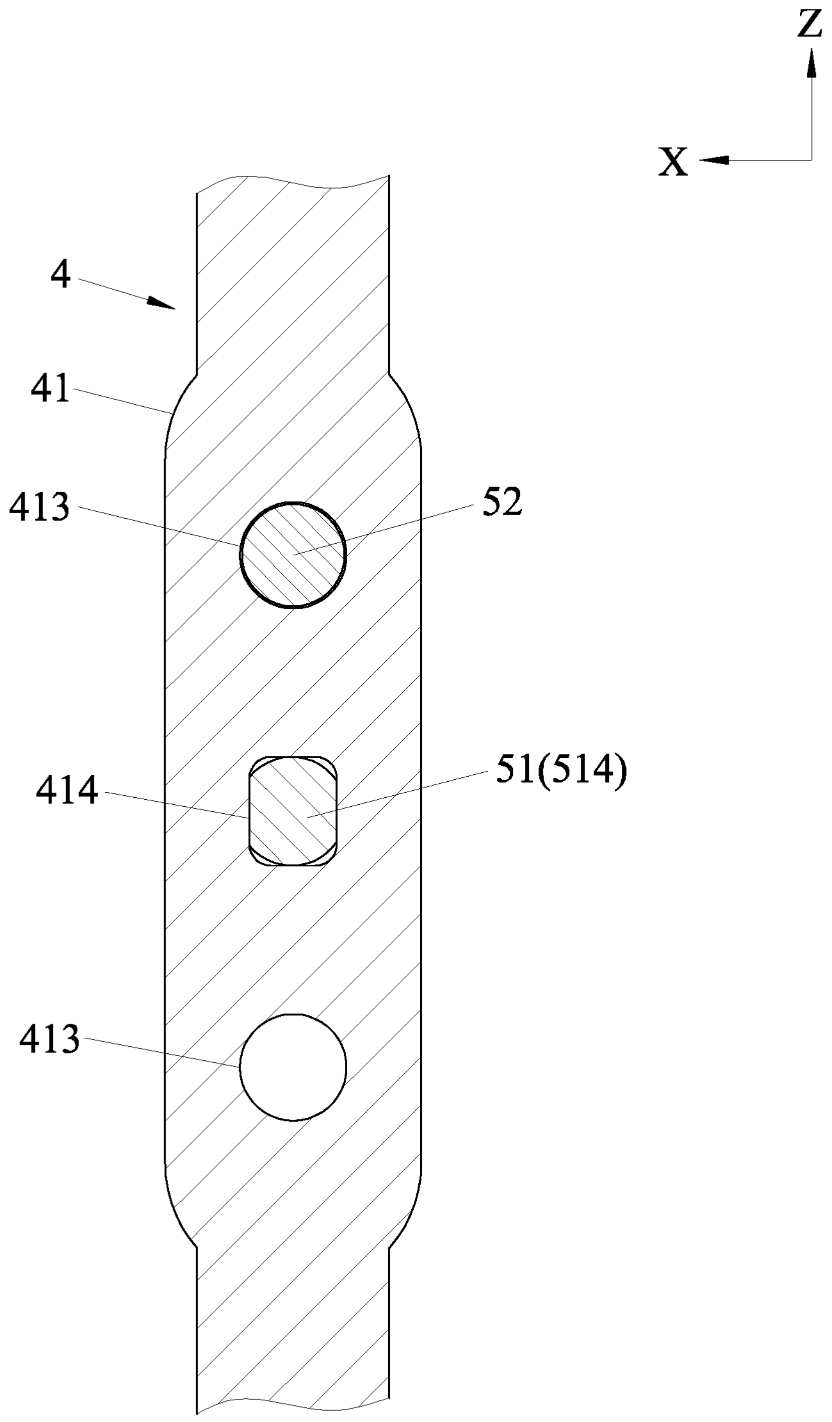
FIG. 19 is a sectional view taken along line XIX-XIX of FIG. 18.
Figure 20:
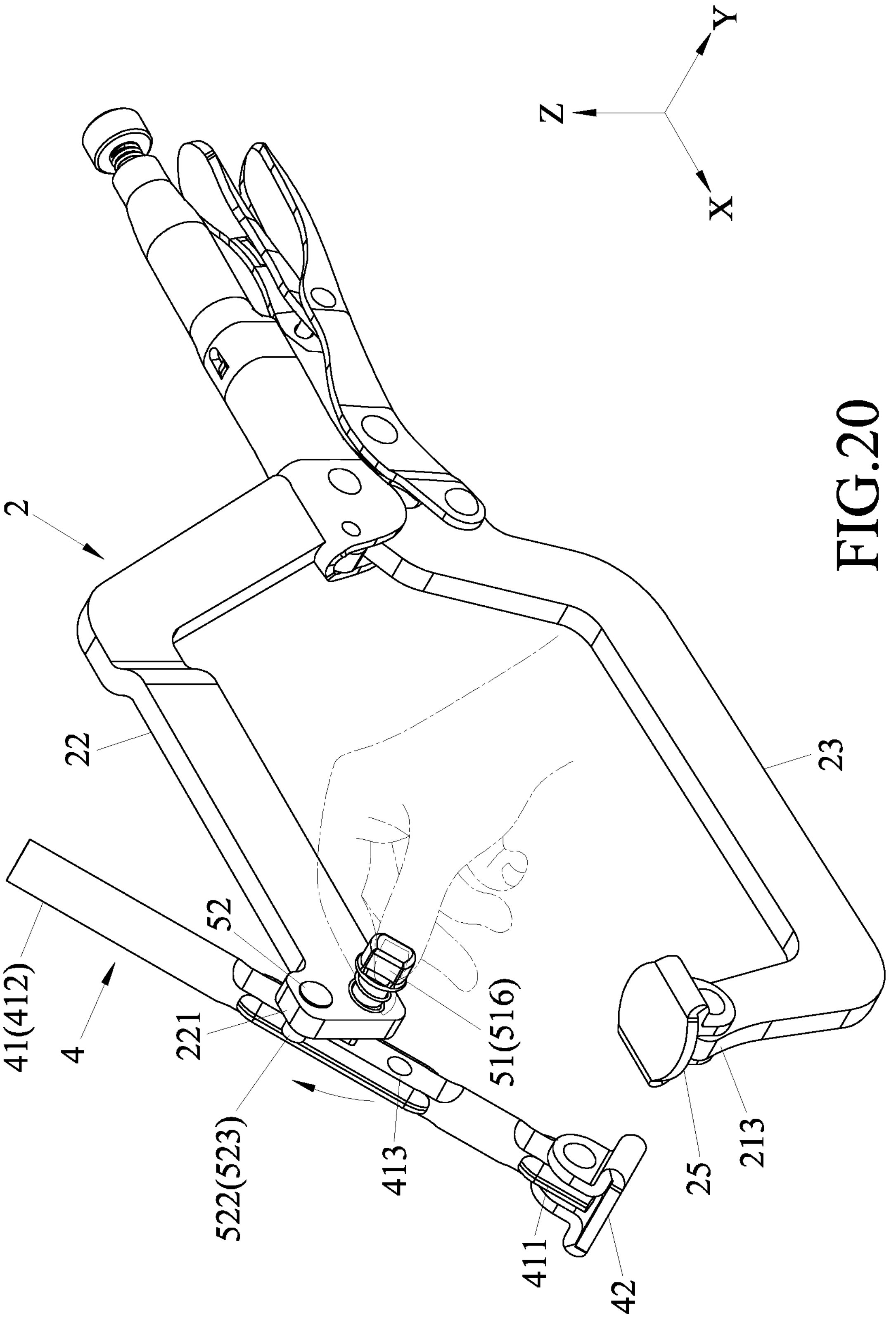
FIG. 20 is a perspective view of the third embodiment during rotation of the rotating shaft.
Figure 21:
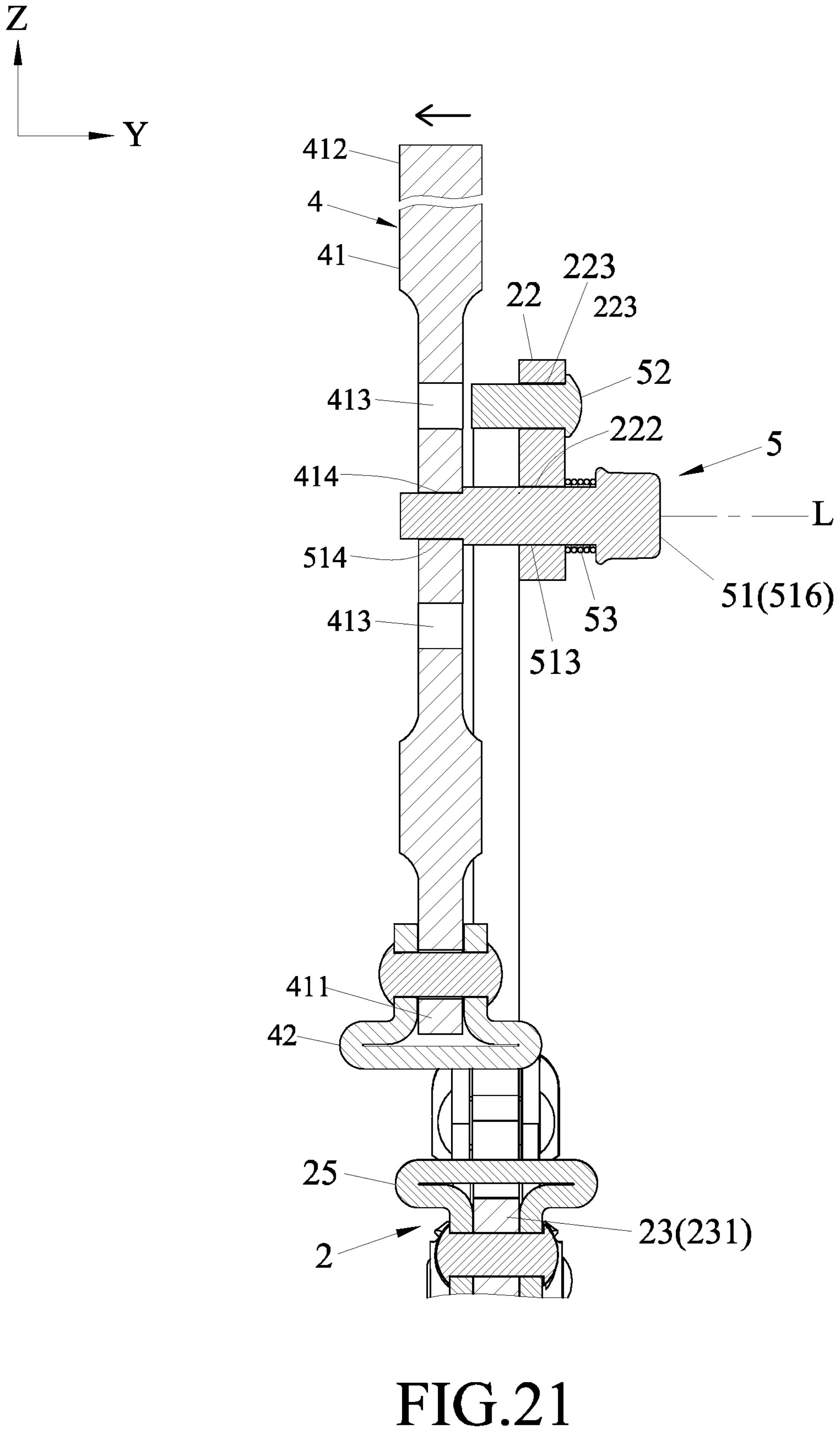
FIG. 21 is a fragmentary sectional view illustrating the state when the rotating shaft is shifted from the first position to a second position.
Figure 22:
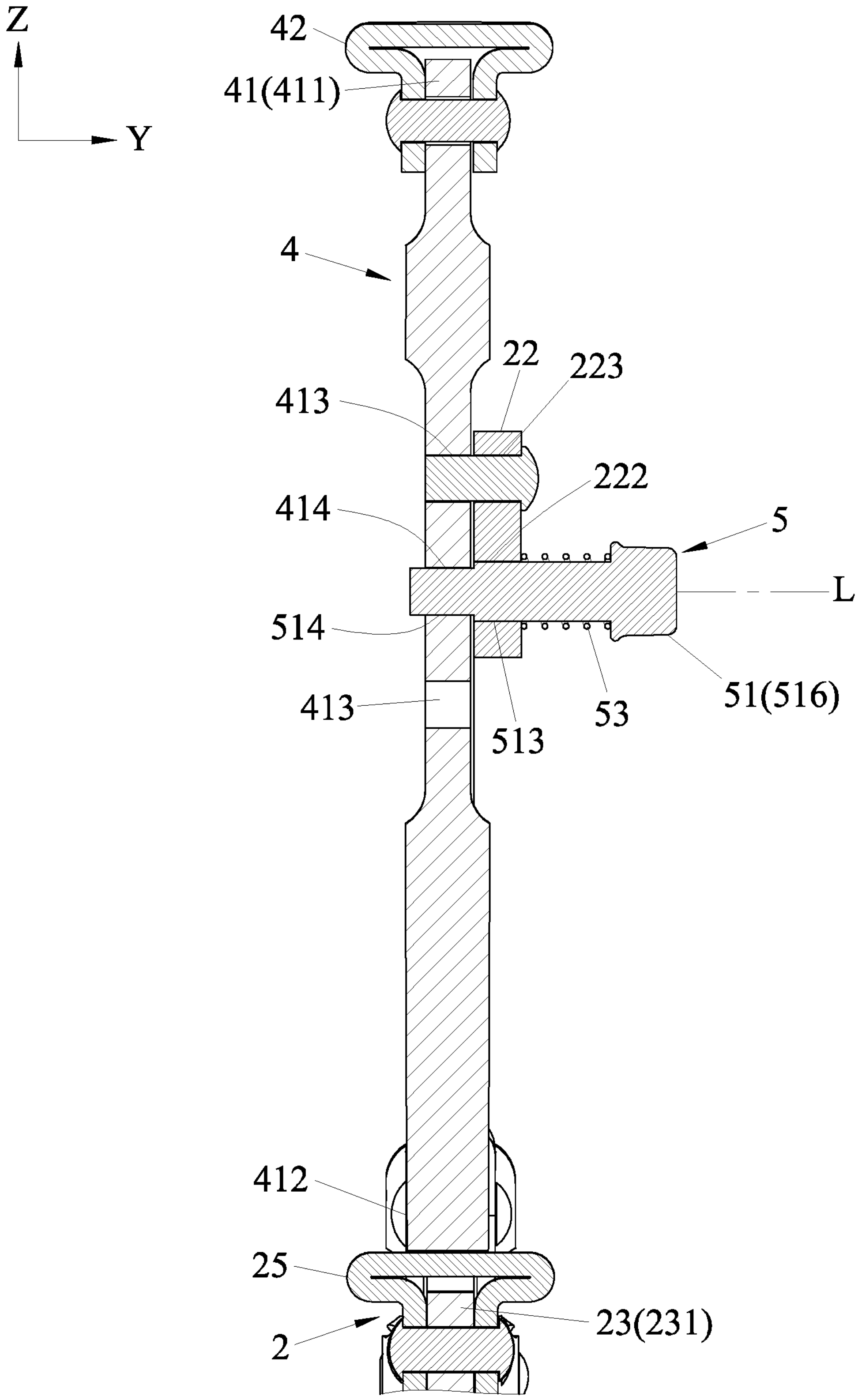
FIG. 22 is a fragmentary sectional view of the third embodiment in a state when the rotating shaft is in the second position.

With reference to FIGS. 12 to 15, in a second embodiment, the operating and pivoting unit 5 includes two of the retaining members 52. Each of the retaining members 52 has the rivet head 521 and the rivet shank 522. The rotating shaft 4 is disposed between the rivet heads 521 of the retaining members 52 and the fixed jaw 22 in the direction of the pivot axis (L). The second retaining sections 523 of the retaining members 52 are respectively engaged in the retained holes 413 of the rotating shaft 4. When the rotating shaft 4 is in one of the first position and the second position, as shown in FIG. 13 and FIG. 15, the first retaining section 523 of one retaining member 52 is engaged in the retaining hole 223 of the fixed jaw 22, and the first retaining section 523 of the other retaining member 52 exposes outwardly. During the shifting of the rotating shaft 4 from the first position to the second position, the user presses the head portion 511 of the pivot member 51 with one hand to move the rotating shaft 4 away from the fixed jaw 22 along the pivot axis (L) so as to disengage one retaining member 52 from the retaining hole 223 of the fixed jaw 22, and rotates the rotating shaft 4 with the other hand to bring the insert end 412 close to the jaw end member 25. Then, the user releases the pressing force to permit the rotating shaft 4 to move toward the fixed jaw 22 by means of the biasing action of the biasing member 53 and to engage the other retaining member 52 in the retaining hole 223 to retain the rotating shaft 4 in the second position.

With reference to FIGS. 16 to 19, in a third embodiment, the pivot member 51 has a rectangular head portion 516 and a shank portion 512 which extends from the head portion 516 along the pivot axis (L). The fixed jaw 22 is interposed between the head portion 516 and the rotating shaft 4 in the direction of the pivot axis (L). The shank portion 512 has the pivot axle section 513 which extends through the pivot hole 222 of the fixed jaw 22, and a connecting section 514 which extends from the pivot axle section 513 and into the connecting hole 414 of the rotating shaft 4. In this embodiment, the connecting hole 414 is in the form of a non-circular hole. The connecting section 514 has a non-circular cross-section and is non-rotatably engaged in the connecting hole 414 to permit rotation of the rotating shaft 4 with the pivot member 51 about the pivot axis (L).

With reference to FIG. 18 and FIGS. 20 to 22, the user grips and presses the head portion 516 of the pivot member 51 with one hand to move the rotating shaft 4 away from the fixed jaw 22 along the pivot axis (L) so as to disengage the retaining member 52 from one retained hole 413 of the rotating shaft 4, and rotates the head portion 516 with the same hand to rotate the rotating shaft 4 so as to bring the clamp member 42 or the insert end 412 close to the jaw end member 25. Then, the user releases the pressing force to permit the rotating shaft 4 to be retained to the first position or the second position. In this embodiment, with the engagement of the connecting hole 414 of the rotating shaft 4 with the connecting section 514 of the pivot member 51, the user can perform the shifting of the rotating shaft 4 with one hand.

As illustrated, with the rotating shaft 4 operable to rotate relative to the pliers-body 2 between the first and second positions, the locking pliers of the disclosure can be shifted to two types of use, and hence the cost of usage is reduced. Moreover, the retaining member 52 of the operating and pivoting unit 5 is kept to engage with one of the fixed jaw 22 and the rotating shaft 4 during shifting of the rotating shaft 4, which prevents loss of the retaining member 52 from the locking pliers.

While the disclosure has been described in connection with what are considered the most practical and embodiments, it is understood that this disclosure is not limited to the disclosed embodiments but is intended to cover various arrangements included within the spirit and scope of the broadest interpretations and equivalent arrangements.

What is claimed is:

1. A locking pliers comprising:

a pliers-body including a fixed jaw, a movable jaw which is pivotable disposed relative to said fixed jaw, and a jaw end member which is disposed on a tip end of said movable jaw;

a rotating shaft movably connected with said fixed jaw, and including a shaft body and a clamp member, said shaft body being rotatably connected with said fixed jaw about a pivot axis and being movable relative to said fixed jaw along the pivot axis, said shaft body having a clamp end and an insert end opposite to each other, said clamp member being disposed on said clamp end, said rotating shaft being operable to rotate relative to said fixed jaw between a first position, where said clamp member is disposed proximate to said jaw end member, and a second position, where said insert end is disposed proximate to said jaw end member; and an operating and pivoting unit including a pivot member which extends along the pivot axis and through said fixed jaw and which is connected with said rotating shaft, said pivot member being operable to move along the pivot axis to bring said rotating shaft into movement close to or away from said fixed jaw, and at least one retaining member which extends through said fixed jaw and said rotating shaft along a retaining axis that is parallel to and offset from the pivot axis so as to retain said rotating shaft to a selected one of the first and second positions, wherein said pivot member is operably moved to bring said rotating shaft into movement away from said fixed jaw and to release retention of said rotating shaft by said at least one retaining member so as to permit rotation of said rotating shaft about the pivot axis.

2. The locking pliers as claimed in claim 1, wherein said pivot member has a head portion which is spaced apart from said rotating shaft in a direction of the pivot axis by said fixed jaw, and a shank portion which extends from said head portion and through said fixed jaw and which is connected with said rotating shaft, said operating and pivoting unit further including a biasing member which is disposed between said head portion and said fixed jaw to bias said head portion away from said fixed jaw so as to bring said rotating shaft toward said fixed jaw.

3. The locking pliers as claimed in claim 1, wherein said pivot member has a pivot axle section which extends through said fixed jaw, a connecting section which extends from said pivot axle section and into said rotating shaft and which has an outer diameter smaller than that of said pivot axle section, and a shoulder which is interposed between said pivot axle section and said connecting section and which abuts against said rotating shaft.

4. The locking pliers as claimed in claim 1, wherein said fixed jaw has a pivot hole which extends therethrough along the pivot axis, said rotating shaft having a connecting hole which extends therethrough and which is aligned with said pivot hole along the pivot axis, said pivot member having a pivot axle section which extends through said pivot hole, and a connecting section which extends from said pivot axle section and into said connecting hole, said connecting hole being in form of a circular hole, said connecting section having a circular cross-section and being rotatably engaged in said connecting hole to permit rotation of said rotating shaft relative to said pivot member about the pivot axis.

5. The locking pliers as claimed in claim 1, wherein said fixed jaw has a pivot hole which extends therethrough along the pivot axis, said rotating shaft having a connecting hole which extends therethrough and which is aligned with said pivot hole along the pivot axis, said pivot member having a pivot axle section which extends through said pivot hole, and a connecting section which extends from said pivot axle section into said connecting hole, said connecting hole being in form of a non-circular hole, said connecting section having a non-circular cross-section and being non-rotatably engaged in said connecting hole to permit rotation of said rotating shaft with said pivot member about the pivot axis.

6. The locking pliers as claimed in claim 5, wherein said pivot member has a head portion and a shank portion which extends from said head portion along the pivot axis and which has said pivot axle section and said connecting section, said fixed jaw being interposed between said head portion and said rotating shaft in a direction of the pivot axis.

7. The locking pliers as claimed in claim 1, wherein said fixed jaw has a retaining hole which extends along the retaining axis, said shaft body having two retained holes which are spaced apart from each other and extend in a direction of the retaining axis, said retaining member having first and second retaining sections which are respectively engaged in said fixed jaw and said rotating shaft, wherein said first and second retaining sections are respectively engaged in said retaining hole and one of said retained holes to retain said rotating shaft to the first position, and are respectively engaged in said retaining hole and the other one of said retained holes to retain said rotating shaft to the second position.

8. The locking pliers as claimed in claim 7, wherein said operating and pivoting unit includes two of said retaining members each of which has said first and second retaining sections, said second retaining sections of said retaining members being respectively engaged in said retained holes such that said first retaining section of one of said retaining members is engaged in said retaining hole and said first retaining section of the other one of said retaining members exposes outwardly when said rotating shaft is in the selected one of the first and second positions.

* * * * *